(12) United States Patent
Gupta et al.

(10) Patent No.: US 9,684,775 B2
(45) Date of Patent: Jun. 20, 2017

(54) METHODS AND SYSTEMS FOR USING BEHAVIORAL ANALYSIS TOWARDS EFFICIENT CONTINUOUS AUTHENTICATION

(71) Applicant: QUALCOMM Incorporated, San Diego, CA (US)

(72) Inventors: Rajarshi Gupta, Sunnyvale, CA (US); Satyajit Prabhakar Patne, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 14/514,662

(22) Filed: Oct. 15, 2014

(65) Prior Publication Data

US 2016/0110528 A1    Apr. 21, 2016

(51) Int. Cl.
| | | |
|---|---|---|
| *G06F 7/04* | (2006.01) | |
| *G06F 12/00* | (2006.01) | |
| *G06F 12/04* | (2006.01) | |
| *G06F 13/00* | (2006.01) | |
| *G06F 17/30* | (2006.01) | |

(Continued)

(52) U.S. Cl.
CPC ............ *G06F 21/31* (2013.01); *G06F 21/316* (2013.01); *G06F 21/577* (2013.01); *H04L 63/08* (2013.01); *H04L 63/105* (2013.01); *H04L 63/1433* (2013.01); *H04W 12/06* (2013.01); *H04W 12/08* (2013.01); *G06F 2221/034* (2013.01);

(Continued)

(58) Field of Classification Search
CPC ...... G06F 21/31; G06F 21/316; G06F 21/577; G06F 2221/037

USPC ...................... 726/4–5, 19, 21–22
See application file for complete search history.

(56) References Cited

U.S. PATENT DOCUMENTS 8,079,079 B2 * 12/2011 Zhang ..................... G06F 21/32
                                                                706/48
8,683,547 B2 *  3/2014 Apparao ................ G06Q 10/06
                                                                705/304

(Continued)

OTHER PUBLICATIONS

Babu B.S., et al., "A Dynamic Authentication Scheme for Mobile Transactions," International Journal of Network Security, Jan. 2009, vol. 8 (1), pp. 59-74.

(Continued)

*Primary Examiner* — Saleh Najjar
*Assistant Examiner* — Feliciano Mejia
(74) *Attorney, Agent, or Firm* — The Marbury Law Group, PLLC

(57) ABSTRACT

A computing device processor may be configured with processor-executable instructions to implement methods of using behavioral analysis and machine learning techniques to identify, prevent, correct, and/or otherwise respond to malicious or performance-degrading behaviors of the computing device. As part of these operations, the processor may perform multifactor authentication operations that include determining one or more of a transaction type criticality value, a user confidence value, a software integrity confidence value, and a historical behavior value, using the one or more of these values to determine a number of authentication factors that are be evaluated when authenticating a user of the computing device, and authenticating the user by evaluating the determined number of authentication factors.

24 Claims, 8 Drawing Sheets

(51) Int. Cl.
*G06F 21/31* (2013.01)
*G06F 21/57* (2013.01)
*H04L 29/06* (2006.01)
*H04W 12/06* (2009.01)
*H04W 12/08* (2009.01)

(52) U.S. Cl.
CPC ........ *H04L 63/145* (2013.01); *H04L 63/1425* (2013.01); *H04L 2463/082* (2013.01)

(56) References Cited

U.S. PATENT DOCUMENTS

| | | | | |
|---|---|---|---|---|
| 8,751,801 | B2* | 6/2014 | Harris | G06F 21/31 713/168 |
| 8,850,589 | B2* | 9/2014 | Pistoia | G06F 21/577 713/188 |
| 2011/0162067 | A1* | 6/2011 | Shuart | G06F 21/31 726/19 |
| 2013/0067547 | A1 | 3/2013 | Thavasi et al. | |
| 2013/0191908 | A1* | 7/2013 | Klein | G06F 21/36 726/18 |
| 2014/0053261 | A1 | 2/2014 | Gupta et al. | |
| 2014/0189808 | A1 | 7/2014 | Mahaffey et al. | |
| 2016/0063229 | A1* | 3/2016 | Key | G06F 21/316 726/1 |
| 2016/0180068 | A1* | 6/2016 | Das | G06F 21/32 726/7 |

OTHER PUBLICATIONS

White Paper: "Enhanced Online Banking Security, Zero Touch Multi-Factor Authentication," 2006, pp. 4, Retrieved from the Internet < URL: https://www.entrust.com/wp-content/uploads/2013/05/EfraudWhitePaper.pdf >.

Zhang H., et al., "mFingerprint: Privacy-Preserving User Modeling with Multimodal Mobile Device Footprints", in Proc. SBP, 2014, pp. 195-203.

* cited by examiner

| Detected Behavior | Transaction Type Criticality Value | User Confidence Value | Software Integrity Confidence Value | Historical Behavior Value | Number of Auth. Factors |
|---|---|---|---|---|---|
| User picks up device from table 452 | 1.0 | 0.5 | 1.0 | 0.7 | 3 |
| User opens email application 454 | 0.4 | 0.7 | 1.0 | 0.7 | 4 |
| User opens payment application 456 | 0.1 | 1.0 | 1.0 | 0.7 | 5 |
| User opens mobile game application 458 | 0.9 | 1.0 | 1.0 | 0.8 | 2 |
| User hands device to child 460 | 0.9 | 0.5 | 1.0 | 0.8 | 3 |
| Child plays with game 462 | 0.9 | 1.0 | 1.0 | 0.8 | 2 |
| Child downloads malware 464 | 0.9 | 1.0 | 0.0 | 0.1 | 6 |

FIG. 4

METHODS AND SYSTEMS FOR USING BEHAVIORAL ANALYSIS TOWARDS EFFICIENT CONTINUOUS AUTHENTICATION

BACKGROUND

Cellular and wireless communication technologies have seen explosive growth over the past several years. Wireless service providers now offer a wide array of features and services that provide their users with unprecedented levels of access to information, resources and communications. To keep pace with these enhancements, personal and consumer electronic devices (e.g., cellular phones, watches, headphones, remote controls, etc.) have become more powerful and complex than ever, and now commonly include powerful processors, large memories, and other resources that allow for executing complex and powerful software applications on their devices. These devices also enable their users to download and execute a variety of software applications from application download services (e.g., Apple® App Store, Windows® Store, Google® play, etc.) or the Internet.

Due to these and other improvements, personal and consumer electronic devices are becoming ubiquitous and ever-present in modern life, and have unprecedented levels of access to information that is generated by, or which relates to, their users. In addition, people frequently use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, new and improved security solutions for authenticating the users of personal and consumer electronic devices, such as smartphones, will be beneficial to consumers.

SUMMARY

The various aspects include methods of performing multifactor user authentication in a computing device by determining in a processor of the computing device one or more of a transaction type criticality value, a user confidence value, a software integrity confidence value, and a historical behavior value, using one or more of the transaction type criticality value, the user confidence value, the software integrity confidence value, and the historical behavior value to determine a number of authentication factors that are be evaluated when authenticating a user of the computing device, and authenticating the user by evaluating the determined number of authentication factors. In an aspect, the method may include using one or more of the transaction type criticality value, the user confidence value, the software integrity confidence value, and the historical behavior value to determine the authentication factors that are be evaluated when authenticating the user of the computing device.

In a further aspect, the method may include monitoring hardware and software systems of the computing device to determine the computing device's current vulnerability to unauthorized use. In a further aspect, determining one or more of the transaction type criticality value, the user confidence value, the software integrity confidence value, and the historical behavior value may include monitoring activities of a software application to collect behavior information, generating a behavior vector that characterizes the monitored activities based on the collected behavior information, and applying the behavior vector to a classifier model to generate analysis results. In a further aspect, the classifier model may be a model of critical activity. In a further aspect, the behavior vector may be a multi-dimension vector data structure.

In a further aspect, the method may include monitoring hardware and software systems of the computing device to learn over time a distinct way in which the user interacts with the computing device, in which authenticating the user by evaluating the determined number of authentication factors includes determining whether a behavior of a software application is consistent with the distinct way in which the user interacts with the computing device.

In a further aspect, determining the number of authentication factors that are to be evaluated may include performing passive authentication operations to authenticate the user without requiring express user interaction for the purpose of authentication, determining a passive authentication confidence value that identifies the device level of confidence in an accuracy of the passive authentication operations, determining a criticality level value that identifies an importance or criticality of a process or software application operating on the computing device, comparing the passive authentication confidence value to the criticality level value to generate a comparison result that identifies whether a level of confidence in the passive authentication outweighs a level of criticality, and determining the number of authentication factors that are be evaluated when authenticating the user of the computing device based on the comparison result.

Further aspects may include a computing device that includes a processor configured with processor-executable instructions to perform operations that may include determining one or more of a transaction type criticality value, a user confidence value, a software integrity confidence value, and a historical behavior value, using one or more of the transaction type criticality value, the user confidence value, the software integrity confidence value, and the historical behavior value to determine a number of authentication factors that are be evaluated when authenticating a user of the computing device, and authenticating the user by evaluating the determined number of authentication factors.

In an aspect, the processor may be configured with processor-executable instructions to perform operations further including using one or more of the transaction type criticality value, the user confidence value, the software integrity confidence value, and the historical behavior value to determine the authentication factors that are be evaluated when authenticating the user of the computing device. In a further aspect, the processor may be configured with processor-executable instructions to perform operations further including monitoring hardware and software systems to determine the computing device's current vulnerability to unauthorized use.

In a further aspect, the processor may be configured with processor-executable instructions to perform operations such that determining one or more of the transaction type criticality value, the user confidence value, the software integrity confidence value, and the historical behavior value includes monitoring activities of a software application to collect behavior information, generating a behavior vector that characterizes the monitored activities based on the collected behavior information, and applying the behavior vector to a classifier model to generate analysis results. I In a further aspect, the processor may be configured with processor-executable instructions to perform operations such that applying the behavior vector to the classifier model to generate the analysis results includes applying the behavior vector to a model of critical activity. In a further aspect, the processor may be configured with processor-executable instructions to perform operations such that applying the behavior vector to the model of critical activity includes applying a multi-dimension vector data structure to the model of critical activity.

In a further aspect, the processor may be configured with processor-executable instructions to perform operations further including monitoring hardware and software systems of the computing device to learn over time a distinct way in which the user interacts with the computing device. In a further aspect, the processor may be configured with processor-executable instructions to perform operations such that authenticating the user by evaluating the determined number of authentication factors includes determining whether a behavior of a software application is consistent with the distinct way in which the user interacts with the computing device.

In a further aspect, the processor may be configured with processor-executable instructions to perform operations such that determining the number of authentication factors that are to be evaluated includes performing passive authentication operations to authenticate the user without requiring express user interaction for the purpose of authentication, determining a passive authentication confidence value that identifies the device level of confidence in an accuracy of the passive authentication operations, determining a criticality level value that identifies an importance or criticality of a process or software application operating on the computing device, comparing the passive authentication confidence value to the criticality level value to generate a comparison result that identifies whether a level of confidence in the passive authentication outweighs a level of criticality, and determining the number of authentication factors that are be evaluated when authenticating the user of the computing device based on the comparison result.

Further aspects may include a non-transitory computer readable storage medium having stored thereon processor-executable software instructions configured to cause a processor of a computing device to perform operations, which may include determining one or more of a transaction type criticality value, a user confidence value, a software integrity confidence value, and a historical behavior value, using one or more of the transaction type criticality value, the user confidence value, the software integrity confidence value, and the historical behavior value to determine a number of authentication factors that are be evaluated when authenticating a user of the computing device, and authenticating the user by evaluating the determined number of authentication factors.

In an aspect, the stored processor-executable software instructions may be configured to cause a processor to perform operations further including using one or more of the transaction type criticality value, the user confidence value, the software integrity confidence value, and the historical behavior value to determine the authentication factors that are be evaluated when authenticating the user of the computing device. In a further aspect, the stored processor-executable software instructions may be configured to cause a processor to perform operations further including monitoring hardware and software systems to determine the computing device's current vulnerability to unauthorized use.

In a further aspect, the stored processor-executable software instructions may be configured to cause a processor to perform operations such that determining one or more of the transaction type criticality value, the user confidence value, the software integrity confidence value, and the historical behavior value includes monitoring activities of a software application to collect behavior information, generating a behavior vector that characterizes the monitored activities based on the collected behavior information, and applying the behavior vector to a classifier model to generate analysis results. In a further aspect, the stored processor-executable software instructions may be configured to cause a processor to perform operations such that applying the behavior vector to the classifier model to generate the analysis results includes applying the behavior vector to a model of critical activity.

In a further aspect, the stored processor-executable software instructions may be configured to cause a processor to perform operations such that applying the behavior vector to the model of critical activity includes applying a multi-dimension vector data structure to the model of critical activity. In a further aspect, the stored processor-executable software instructions may be configured to cause a processor to perform operations further including monitoring hardware and software systems of the computing device to learn a distinct way in which the user interacts with the computing device over time. In a further aspect, the stored processor-executable software instructions may be configured to cause a processor to perform operations such that authenticating the user by evaluating the determined number of authentication factors includes determining whether a behavior of a software application is consistent with the distinct way in which the user interacts with the computing device.

In a further aspect, the stored processor-executable software instructions may be configured to cause a processor to perform operations such that determining the number of authentication factors that are to be evaluated includes performing passive authentication operations to authenticate the user without requiring express user interaction for the purpose of authentication, determining a passive authentication confidence value that identifies the device level of confidence in an accuracy of the passive authentication operations, determining a criticality level value that identifies an importance or criticality of a process or software application operating on the computing device, comparing the passive authentication confidence value to the criticality level value to generate a comparison result that identifies whether a level of confidence in the passive authentication outweighs a level of criticality, and determining the number of authentication factors that are be evaluated when authenticating the user of the computing device based on the comparison result.

Further aspects include a computing device that includes means for determining one or more of a transaction type criticality value, a user confidence value, a software integrity confidence value, and a historical behavior value, means for using one or more of the transaction type criticality value, the user confidence value, the software integrity confidence value, and the historical behavior value to determine a number of authentication factors that are be evaluated when authenticating a user of the computing device, and means for authenticating the user by evaluating the determined number of authentication factors. In an aspect, the computing device may include means for using one or more of the transaction type criticality value, the user confidence value, the software integrity confidence value, and the historical behavior value to determine the authentication factors that are be evaluated when authenticating the user of the computing device.

In a further aspect, the computing device may include means for monitoring hardware and software systems to determine the computing device's current vulnerability to unauthorized use. In a further aspect, means for determining one or more of the transaction type criticality value, the user confidence value, the software integrity confidence value, and the historical behavior value may include means for monitoring activities of a software application to collect behavior information, means for generating a behavior vector that characterizes the monitored activities based on the collected behavior information, and means for applying the behavior vector to a classifier model to generate analysis results.

In a further aspect, means for applying the behavior vector to the classifier model to generate the analysis results may include means for applying the behavior vector to a model of critical activity. In a further aspect, means for applying the behavior vector to the model of critical activity may include means for applying a multi-dimension vector data structure to the model of critical activity. In a further aspect, the computing device may include means for monitoring hardware and software systems of the computing device to learn a distinct way in which the user interacts with the computing device over time, in which means for authenticating the user by evaluating the determined number of authentication factors includes means for determining whether a behavior of a software application is consistent with the distinct way in which the user interacts with the computing device.

In a further aspect, means for determining the number of authentication factors that are to be evaluated may include means for performing passive authentication operations to authenticate the user without requiring express user interaction for the purpose of authentication, means for determining a passive authentication confidence value that identifies the device level of confidence in an accuracy of the passive authentication operations, means for determining a criticality level value that identifies an importance or criticality of a process or software application operating on the computing device, means for comparing the passive authentication confidence value to the criticality level value to generate a comparison result that identifies whether a level of confidence in the passive authentication outweighs a level of criticality, and means for determining the number of authentication factors that are be evaluated when authenticating the user of the computing device based on the comparison result.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

FIG. 4 is an illustration of the example events and values that may be used to intelligently determine the number of authentication factors that are be evaluated when authenticating a user of the computing device.

DETAILED DESCRIPTION

Figure 1:
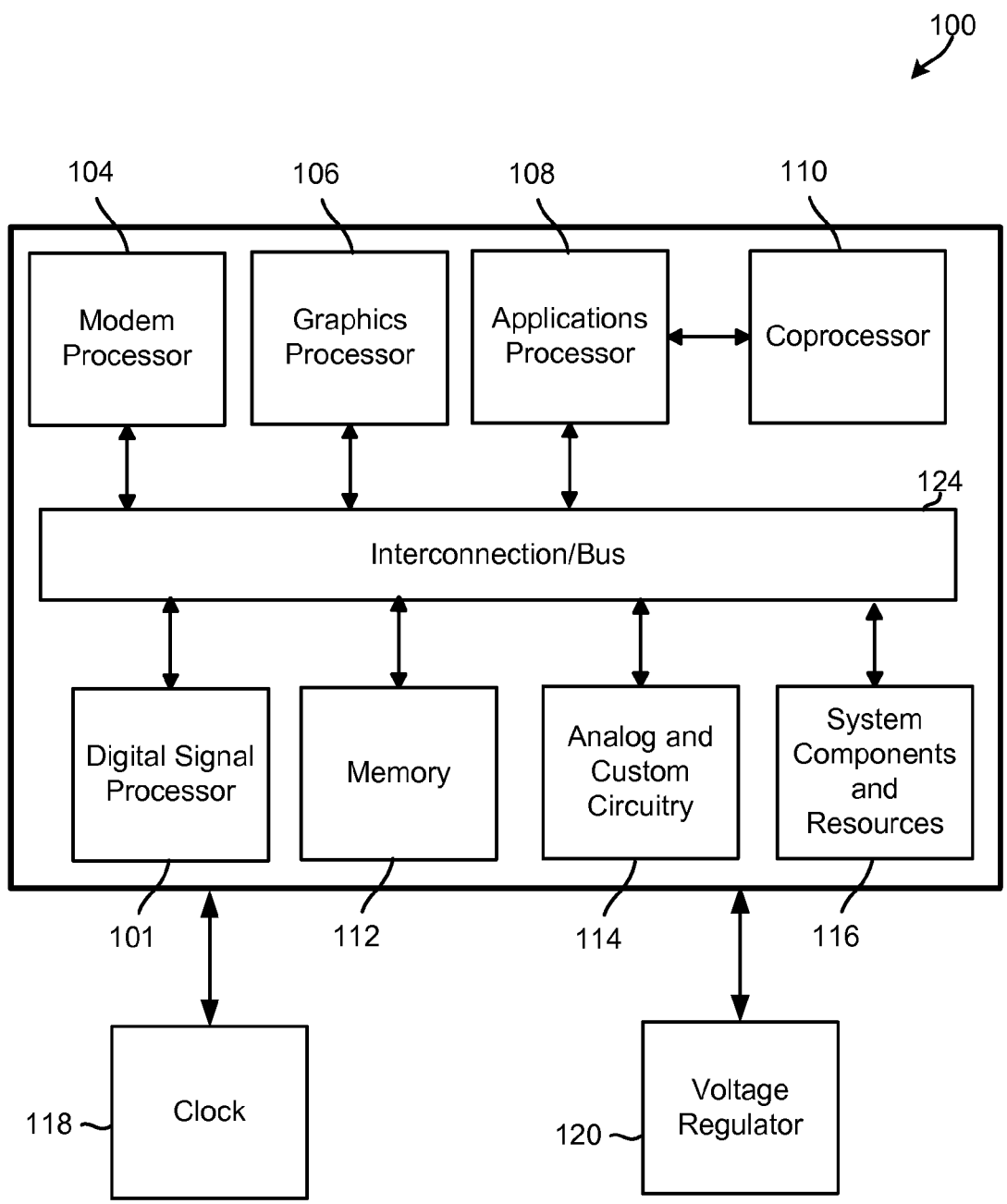
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods, and computing devices configured to implement the methods, of using behavioral analysis and machine learning techniques to perform multifactor authentication operations for continuously/repeatedly authenticating a user of a computing device. The multifactor authentication operations may include determining one or more of a transaction type criticality value, a user confidence value, a software integrity confidence value, and a historical behavior value, using one or more of these values to determine a number of authentication factors that are be evaluated when authenticating a user of the computing device, and authenticating the user by evaluating the determined number of authentication factors. By using machine learning and/or behavioral analysis techniques, the computing device may intelligently and continuously authenticate the user using levels of authentication necessary for current activities, behaviors, users, etc., without requiring more authentication factors than necessary, which could have a significant negative impact on the performance, usability, security, or power consumption characteristics of the device. Additional improvements to the functions, functionalities, and/or functioning of computing devices will be evident from the detailed descriptions of the aspects provided below.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

There are a variety of authentication techniques that may be used by a computing device to ensure that a user is authorized to access the computing device, its operating system, its software applications, and/or its stored content. Such techniques include active authentication, passive authentication, single-factor authentication (SFA), and multifactor authentication (MFA).

Currently, most computing devices implement and use an active single-factor authentication technique that requires that a user enter/input authentication credentials, such as entry of a personal identification number (PIN) or a username and password combination, prior to that user being granted access to the device. This authentication technique is a "single-factor" authentication because it only requires that the computing device evaluate a single authentication factor, such as the user's knowledge of authentication credentials. This technique is also an active authentication because it requires that the user expressly input information (i.e., his or her authentication credentials) for the purpose of authentication.

In recent years, cyber attackers and thieves have grown in sophistication, and can now more readily obtain or guess a user's authentication credentials without that user's knowledge or consent. As a result, single-factor authentication solutions are no longer adequate for protecting computing devices from unauthorized use. For this reason, an increasing number of computing devices now implement and use multifactor authentication (MFA) solutions to ensure that only authorized users access the computing device, its operating system, its software applications, or its stored content.

A multifactor authentication solution tests two or more different types of independent authentication factors, such as two or more of a knowledge factor, a possession factor, and an inherence factor. A knowledge factor may be an authentication factor that tests the user's knowledge of a secret, such as by requiring that the user enter a PIN or password, draw a pattern, or select an image. A possession factor may be an authentication factor that tests the user's ownership/possession of an object, such as a key fob, SMS-based security token, USB token, random-number generating token, smartcard, etc. An inherence factor may be an authentication factor that tests a feature or characteristic that is intrinsic to the user, commonly a biometric such as a finger print, iris pattern, etc. By testing different types of authentication factors, multifactor authentication solutions greatly improve the security of the computing device.

A computing device may implement a multifactor authentication solution by defining multiple independent operation sets for testing/evaluating different types of authentication factors, and executing two or more of these operation sets each time a user is authenticated. For example, a computing device may define a first set of operations for evaluating a pattern (a knowledge factor) and a second set of operations for evaluating a random-number token (possession factor). Example operations for evaluating a pattern (which is a knowledge factor) may include displaying a prompt, requesting that the user select or draw a pattern, and comparing the selected/drawn pattern to an encrypted pattern value stored in memory. Example operations for evaluating a random-number token (and thus a possession factor) may include generating a security token value (e.g., a number value based on the current time and/or cryptographic key, etc.), sending the security token value to the authorized user of the device via a separate medium (e.g., via email, to a key fob, etc.), displaying a prompt requesting that the user input the security token value, and comparing the user input to the original security token value. The computing device may perform both sets of operations to evaluate the two different types of authentication factors (i.e., a knowledge factor and a possession factor) each time the user is authenticated. By evaluating two different types of authentication factors (i.e., a knowledge factor and a possession factor), this multifactor authentication solution improves the security of the computing device because a hacker would have to obtain both the knowledge factor (e.g., guess or steal a password) and the possession factor (e.g., steal a USB token or security fob). Also, unlike a knowledge factor, a user is likely to discover when a possession factor is missing, and thus able to detect when security may be compromised.

The security of the computing device may be further improved by increasing the number of factors that are evaluated for each type of authentication factor. For example, a computing device that is configured to test two knowledge factors (e.g., a password and a pattern) and two possession factors (e.g., a USB token and a key fob) is generally more secure than a similarly equipped computing device that is configured to test two knowledge factors and one possession factor.

The security of a computing device may also be improved by repeatedly evaluating a large number of authentication factors. That is, the more authentication factors that the computing device evaluates and the more often those factors are evaluated, the stronger its security level. Computing devices that evaluate the authentication factors repeatedly, frequently, or continuously are more secure than similarly equipped devices that evaluate authentication factors once (e.g., at login, etc.), or in response to select events (e.g., a request to install software or access sensitive information, etc.). However, conventional solutions that repeatedly evaluate a large number of authentication factors often have a negative impact on the performance, usability, and power consumption characteristics of the computing device. Further, users may become annoyed by frequent prompts for authentication and disable such features in response, thereby rendering their devices more vulnerable to attack. As a result, conventional solutions are not suitable for inclusion or use in resource-constrained computing devices, such a smartphones, which have limited processing and battery resources, and for which a pleasant user experience is important.

Using conventional solutions, a computing device is required to perform multiple complex or power intensive operations (e.g., display a prompt, receive user input, compare user input to stored value, etc.) for each authentication factor that is evaluated. Further, most conventional solutions require some form of user interaction with the device (e.g., to input a password, scan a finger, etc.) each time the user is authenticated. Requiring that a user repeatedly input authentication credentials and/or to perform multiple authentication operations (e.g., enter a password, then scan a finger) is annoying, distracting, and degrades the user experience. For all these reasons, conventional multifactor solutions do not evaluate a sufficient number of authentication factors, do not authenticate the user continuously, do not provide adequate levels of protection/security, or have a significant negative impact on the performance, usability, or power consumption characteristics of the computing device.

In addition, most conventional solutions test the same number of authentication factors each time the user is authenticated. Some solutions define the authentication factors (and their associated operation sets) statically, and dynamically select the authentication factors that are evaluated at runtime. Yet, these computing devices select the same number (or a previously defined number) of authentication factors for testing each time the user is authenticated.

Conventional solutions also do not dynamically compute/determine the operations that are to be performed when evaluating the authentication factors, and do not continuously authenticate the user based on the current behavior of the device, the behaviors of the software applications operating on the device, the types of transactions that are underway, user confidence values, software integrity confidence values, and/or historical behavior information. In addition, conventional solutions do not intelligently and dynamically determine the number and types of authentication factors that are to be evaluated at runtime based on device's current behavior, current vulnerability to attacks, or the device's current security risk tolerance level. Conventional solutions also do not adequately balance tradeoffs between the performance, usability, security, and power consumption characteristics of the device. For all these reasons, conventional solutions are not suitable for inclusion or use in resource-constrained computing devices.

The various aspects overcome the limitations of conventional user-authentication solutions by configuring a computing device to use machine learning and/or behavioral analysis techniques to intelligently, efficiently, and dynamically determine whether authentication is required, the number of authentication factors that are to be evaluated, the types of authentication factors that are to be evaluated, and the operations that to be performed when evaluating the authentication factors. The computing device may be configured to authenticate a user, application, or activity based on the current behaviors of the device, the types of transactions that are underway, user confidence values, user interactions, software integrity confidence values, and/or the historical behaviors of software applications operating on the device, etc.

By using machine learning and/or behavioral analysis techniques, the computing device may continuously (or near continuously) monitor the hardware and/or software systems of the device and accurately determine the computing device's current vulnerability to unauthorized use (or attacks) without consuming an excessive amount of the device's processing or power resources under the circumstances. The computing device may also intelligently determine the number of authentication factors that should be evaluated based on computing device's current vulnerability to unauthorized use (or attacks), and continuously evaluate a focused number of authentication factors so as to intelligently balance tradeoffs between the security, performance, usability, and power consumption characteristics of the device.

By using machine learning and/or behavioral analysis techniques, the computing device may identify and evaluate authentication factors that do not require explicit user interaction with the device (e.g., the entry of user credentials, etc.). This allows the computing device to continuously authenticate the user, application, or activity and/or to evaluate a large number of authentication factors without degrading the user experience.

For all the above-mentioned reasons, the various aspects are well-suited for inclusion and use in resource-constrained computing devices, such as smartphones, which have limited processing and battery resources and for which security and a pleasant user experience are important.

In an aspect, the computing device may be configured to compute a vulnerability value identifying the device's level of vulnerability to attacks/unauthorized use. The computing device may compute or select the authentication factors and/or determine the number of authentication factors based on the determined vulnerability value, and evaluate the authentication factors to authenticate a user, application, or activity. The computing device may be configured to compute the vulnerability value based on the current behaviors of the device, the types of transactions that are underway, user confidence values, software integrity confidence values, historical behaviors of the software applications currently operating on the device, and/or other behaviors, events, or conditions detected in the device.

Generally, users interact with their computing devices in a unique or distinct way. For example, mobile device users often have a distinct work or communication style, use specific software applications or specific types of software applications, use their mobile device to perform specific activities or accomplish specific tasks, perform activities in a specific order, perform specific activities at specific times, interact with specific software applications in a specific ways, etc. In an aspect, the computing device may be configured to learn the distinct way in which a user interacts with his/her device over time, and use this information to intelligently authenticate the user.

In an aspect, the computing device may be configured to perform on-device learning operations to compute or determine a user confidence value that identifies the device's confidence (e.g., via a probability value, etc.) that the user is an authorized/authenticated user based on the distinct way in which a user interacts with the device. The user confidence value may indicate whether, or the degree in which, the device's current usage pattern is consistent with normal usage patterns of the device by a specific user. The computing device may use the user confidence value to compute/select the authentication factors and/or to intelligently determine the number of authentication factors that should be evaluated by the device when authenticating the user. For example, the computing device may evaluate a reduced number of authentication factors when the user confidence value is high, and evaluate a greater number of authentication factors when the user confidence value is low (i.e., when the detected usage patterns are not consistent with the normal usage patterns of the device or the user). The computing device may also use the user confidence value to compute a vulnerability value that identifies the device's level of vulnerability to attacks or unauthorized use, and use the vulnerability value to determine the number of authentication factors that should be evaluated by the device when authenticating the user.

In an aspect, the computing device may be configured to continuously (or near-continuously) monitor the activities or behavior of processes, software applications, and hardware sensors of the device to collect behavior information, use the collected behavior information to identify the user's device usage patterns, and use the identified device usage patterns to determine the user confidence value.

In an aspect, the computing device may be configured to determine the types of transactions that are underway, determine whether any of these transactions are critical activities that require close monitoring, compute a transaction type criticality value, and compute/select the authentication factors and/or the number of authentication factors that are evaluated based on the transaction type criticality value (e.g., based on the types of transactions that are currently underway). For example, the computing device may evaluate a reduced number of authentication factors when there are no critical activities underway, and evaluate a greater number of authentication factors when one or more critical activities are underway. The computing device may also compute the vulnerability value as a function of the types of transactions that are underway (e.g., by using the transaction type criticality value), and use the vulnerability value to determine the number of authentication factors that should be evaluated by the device when authenticating the user. In this manner, the number of authentication factors employed may be responsive to or consistent with the current usage and operating state, and thus the current vulnerability of the computing device and risk to the user posed by the current circumstances.

The computing device may be configured to determine the types of transactions that are underway and/or to compute the transaction type criticality value by determining whether any of the processes/software applications operating on the device have been labeled as vital/critical software applications (e.g., banking apps, applications that store credit card information, etc.) that are susceptible to abuse, expose the user to risk (e.g., identity theft or loss of money), or which otherwise require close scrutiny. The computing device may also monitor the activities/behavior of a process or software application to collect behavior information, generate a behavior vector that represents the monitored activities/behavior based on the collected behavior information, compare the generated behavior vector to a classifier model or a model of critical behavior to determine whether the process/software application is a vital/critical software application or engaged in critical activity that requires close monitoring, and compute the transaction type criticality value based on the number of activities, processes, or software applications that determined to be vital/critical.

In an aspect, the computing device may be configured to determine a software integrity confidence value that represents or quantifies a degree of suspicion or confidence (e.g., via a probability value, etc.) that a software application is authorized, authenticated, or non-benign. The computing device may use such software integrity confidence values to compute/select the authentication factors and/or determine the number of authentication factors that are to be evaluated under the current circumstances. The computing device may also compute the vulnerability value as a function of the software integrity confidence value, and use the vulnerability value to determine the number of authentication factors that should be evaluated by the device when authenticating the user.

In an aspect, the computing device may be configured to collect and store historical behavior information for each process, software application, or device behavior that is evaluated by the device. The historical behavior information may include information suitable for identifying a previously observed behavior of a software application or process, the priority or relative importance of that behavior, whether the behavior was previously analyzed/classified as benign or non-benign, a classification confidence value for the previous classification of the behavior, a severity value identifying the degree of maliciousness or performance degradation (for behaviors classified as non-benign), timestamp values identifying when the behavior was last observed, analyzed or classified, and other similar information.

The computing device may be configured to use the historical behavior information to compute a historical behavior value (a confidence/probability value), and use the historical behavior value to select/compute authentication factors and/or to determine the number of authentication factors that should be analyzed when authenticating a user. For example, the computing device may be configured to select stronger or more robust authentication factors and/or to evaluate a larger number of authentication factors when the historical behavior information indicates that the behavior of a software application currently operating on the device was previously classified as non-benign (or when the historical behavior value is low or close to zero). Similarly, the computing device may be configured to select leaner/weaker authentication factors or evaluate a fewer number of authentication factors when the historical behavior information indicates that none of its current behaviors were recently (e.g., in the last hour, day, week, month, year, etc.) classified as suspicious or non-benign, or when the historical behavior value is high or close to one. The computing device may also be configured compute the vulnerability value as a function of the historical behavior information or historical behavior value, and use the vulnerability value to determine the number of authentication factors that should be evaluated by the device when authenticating the user.

In the various aspects, the computing device may be configured compute the vulnerability value as a function of some or all of the transaction type criticality value, the user confidence value, the software integrity confidence value, and/or the historical behavior value. The computing device may use the vulnerability value to determine the number of authentication factors that should be evaluated by the device when authenticating the user. The computing device may also use the vulnerability value to intelligently select/compute authentication factors.

By using machine learning and/or behavioral analysis techniques, the computing device may continuously (or near continuously) compute, select, and/or evaluate the authentication factors without consuming an excessive amount of its processing or power resources. The computing device may accomplish this stochastically or using probabilistic methods by determining risk level at all times, not just at critical times (e.g., login time).

In an aspect, the computing device may be configured to perform passive authentication operations to authenticate the user without requiring express user interaction for the purpose of authentication. In this aspect, the computing device may be configured to determine a passive authentication confidence value that identifies the device level of confidence in the accuracy of the passive authentication, determine a criticality level value that identifies the importance or criticality of a process or software application operating on the device, compare the passive authentication confidence value to the criticality level value to determine whether the level of confidence in the passive authentication is adequate for the level of criticality, and determine (e.g., compute, or select) the authentication factors and/or the number of authentication factors to be used in passive authentication operations based on a result of the comparison.

In the various aspects, the computing device may be configured to perform any or all of the operations discussed in this application via a comprehensive behavioral monitoring and analysis system of the computing device. The behavioral monitoring and analysis system may accomplish these operations without having a significant, negative, or user perceivable impact on the responsiveness, performance, or power consumption characteristics of the computing device.

The behavioral monitoring and analysis system may be configured to quickly and efficiently identify non-benign software applications (e.g., applications that are malicious, poorly written, incompatible with the device, etc.), and prevent such applications from degrading the a computing device's performance, power utilization levels, network usage levels, security, and/or privacy over time. The behavioral monitoring and analysis system may be further configured to determine the number of authentication factors that are evaluated by the device, determine the types of authentication factors that are evaluated, and determine the operations that are to be performed when evaluating the authentication factors. The behavioral monitoring and analysis system may be further configured to authenticate the user, process, software application, or any other entity or component based on current behaviors of the device, the types of transactions that are underway, user confidence values, software integrity confidence values, or the historical behaviors of software applications operating on the device.

The behavior-based monitoring and analysis system may include an observer process, daemon, module, or sub-system (herein collectively referred to as a "module") a behavior extractor module, and an analyzer module. The observer module may be configured to instrument or coordinate various application programming interfaces (APIs), registers, counters, or other device components (herein collectively "instrumented components") at various levels of the computing device system, collect behavior information from the instrumented components, and communicate (e.g., via a memory write operation, function call, etc.) the collected behavior information to the behavior extractor module. The behavior extractor module may use the collected behavior information to generate behavior vectors that each represent or characterize many or all of the observed events, conditions, tasks, activities, and/or behaviors (herein collectively "behaviors") associated with one or more specific threads, processes, software applications, modules, or components of the device. The behavior extractor module may communicate (e.g., via a memory write operation, function call, etc.) the generated behavior vectors to the analyzer module, which may apply the behavior vectors to classifier models to generate analysis results, and use the analysis results to determine whether a software application or device behavior is benign or non-benign (e.g., malicious, poorly written, performance-degrading, etc.). The device processor may then perform various operations to correct, heal, cure, isolate, or otherwise fix the identified problems (e.g., behaviors determined to be non-benign).

Each behavior vector may be an information structure that includes or encapsulates one or more "behavior features." A behavior feature may be an abstract number or symbol that represents all or a portion of an observed event, condition, activity, operation, relationship, interaction, or behavior in the mobile device. Each behavior feature may be associated with a data type that identifies a range of possible values, operations that may be performed on those values, the meanings of the values, and other similar information. The data type may be used by the mobile device to determine how the corresponding behavior feature (or feature value) should be measured, analyzed, weighted, or used.

In an aspect, the computing device may be configured to generate a behavior vector of size "n" that maps the behavior the process/application into an n-dimensional space. Each number or symbol in the behavior vector (i.e., each of the "n" values stored by the vector) may represent the value of a feature of the device. The computing device may analyze the behavior vector (e.g., by applying the behavior vector to a model of critical behavior, etc.) to determine whether the process/software application is anomalous. The computing device may also aggregate the behavior scores of all processes/applications in the system to identify the normal/anomalous behavior of the system.

In an aspect, the computing device may be configured to store models of critical behaviors. A model of critical behavior may identify a common "critical" behavior in association with a criticality level (or priority or importance value). Examples of critical behaviors include operations for processing near-field communication (NFC) payments, banking transactions, taking of pictures, recording of audio of video information, accessing a password or PIN, sending or receiving secured or encrypted emails, etc. Models of these and other critical behaviors may be stored in a cloud server or network, shared across a large number of devices, sent to the computing device periodically or on demand, and customized in the device to account for critical behavior associated with an individual user. A model of critical behavior may be, or may be included, in a classifier model.

A classifier model may be a behavior model that includes data, entries, decision nodes, decision criteria, and/or information structures that may be used by a device processor to quickly and efficiently test or evaluate specific features, factors, data points, entries, APIs, states, conditions, behaviors, software applications, processes, operations, components, etc. (herein collectively "features") or other aspects of the device's behavior. A classifier model may also include information that may be used by a device processor to determine the nature of the relationships between software applications and/or the behaviors that to be monitored in the mobile device.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes or prioritizes tests on the features/entries that are most relevant for determining whether a particular mobile device behavior is not benign. A local classifier model may be a lean classifier model that is generated in the mobile computing device. By generating classifier models in the computing device in which the models are used, the various aspects allow the computing device to accurately identify the specific features that are most important in determining whether a behavior on that specific device is benign or contributing to that device degradation in performance. These aspects also allow the computing device to accurately prioritize the features in the classifier models in accordance with their relative importance to classifying behaviors in that specific device.

The various aspects (including the aspects described with reference to FIGS. 2-7), may be implemented in a number of different mobile devices, including single processor and multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 101, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., Core-Connect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 101, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to the SOC 100 discussed above, the various aspects may be implemented in a wide variety of computing systems, which may include a single processor, multiple processors, multicore processors, or any combination thereof.

Figure 2:
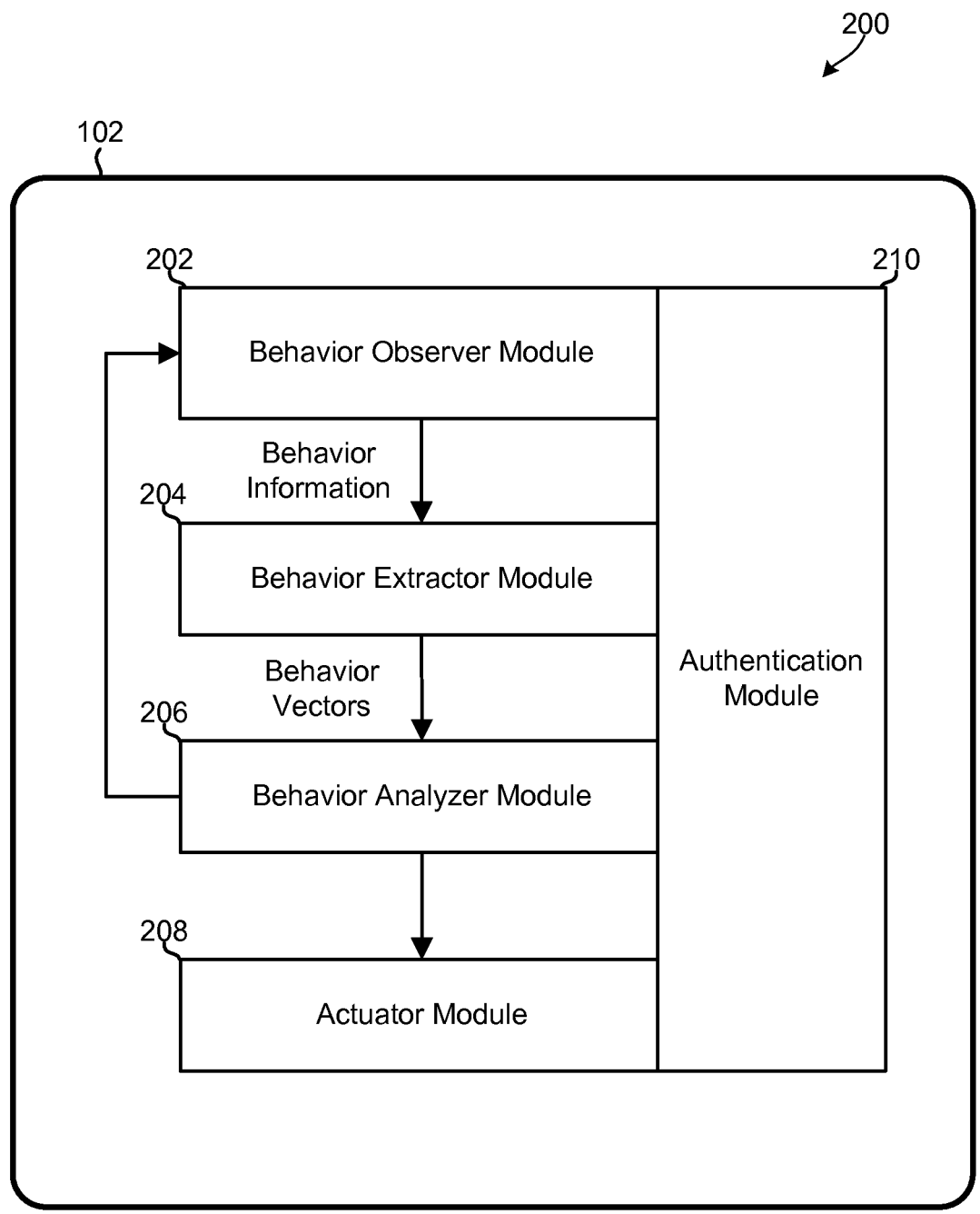
FIG. 2 is a block diagram illustrating example logical components and information flows in an aspect mobile device configured to determine the number of authentication factors that are be evaluated when authenticating a user of the computing device.

FIG. 2 illustrates example logical components and information flows in an aspect computing device that includes a behavior-based security system 200 configured to use behavioral analysis techniques to authenticate a user, application, or activity in accordance with the various aspects. In the example illustrated in FIG. 2, the computing device is a mobile device 102 that includes a device processor (i.e., mobile device processor) configured with executable instruction modules that include a behavior observer module 202, a behavior extractor module 204, a behavior analyzer module 206, an actuator module 208, and an authentication module 210.

In various aspects, all or portions of the authentication module 210 may be implemented as part of the behavior observer module 202, the behavior extractor module 204, the behavior analyzer module 206, or the actuator module 208. Each of the modules 202-210 may be a thread, process, daemon, module, sub-system, or component that is implemented in software, hardware, or a combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 102.

The authentication module 210 may be configured to intelligently, efficiently, and dynamically determine whether authentication is required, the number of authentication factors that are to be evaluated, the types of authentication factors that are to be evaluated, and the operations that to be performed when evaluating the authentication factors based on any or all of the information collected, generated, or analyzed by the other modules 202-208. For example, the authentication module 210 may use the information collected by the behavior observer module 202 to determine the current behaviors of the device, the types of transactions that are underway, user confidence values, and software integrity confidence values, and use any or all such information to determine the number and types of authentication factors that are to be evaluated when authenticating the user. As another example, the authentication module 210 may be configured to store the results of applying behavior vectors to classifier models by the behavior analyzer module 206 as historical behavior information, use the stored historical behavior information to compute the historical behavior value (i.e., a confidence or probability value), and use the historical behavior value to determine the device features that are to be monitored by the behavior observer module 202 and analyzed by the behavior analyzer module 206 to authenticate the user.

In an aspect, the authentication module 210 may be configured to select for testing two or more different types of independent authentication factors, including two or more of a knowledge factor type, a possession factor type, and an inherence factor type. In an aspect, the authentication module 210 may be configured to determine the operations for testing or evaluating an authentication factor. Such operations may include, or may be based on, any of the activities monitored by behavior observer module 202 or any of the behaviors analyzed by the behavior analyzer module 206.

The behavior observer module 202 may be configured to instrument application programming interfaces (APIs), counters, hardware monitors, etc. at various levels/modules of the device, and monitor the activities, conditions, operations, and events (e.g., system events, state changes, etc.) at the various levels/modules over a period of time. The behavior observer module 202 may collect behavior information pertaining to the monitored activities, conditions, operations, or events, and store the collected information in a memory (e.g., in a log file, etc.).

The behavior observer module 202 may be configured to monitor the activities of the mobile computing device 102 by collecting information pertaining to library API calls in an application framework or run-time libraries, system call APIs, file-system and networking sub-system operations, device (including sensor devices) state changes, and other similar events. In addition, the behavior observer module 202 may monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor the activities of the mobile computing device 102 by monitoring data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the activities of the mobile computing device 102 by monitoring the system resource usage, which may include monitoring the number of forks, memory access operations, number of files open, etc. The behavior observer module 202 may monitor the state of the mobile computing device 102, which may include monitoring various factors, such as whether the display is on or off, whether the device is locked or unlocked, the amount of battery remaining, the state of the camera, etc. The behavior observer module 202 may also monitor inter-process communications (IPC), such as by monitoring intents to crucial services (browser, contracts provider, etc.), the degree of inter-process communications, pop-up windows, etc.

The behavior observer module 202 may also monitor the activities of the mobile computing device 102 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device 102.

The behavior observer module 202 may also monitor the activities of the mobile computing device 102 by monitoring one or more hardware counters that denote the state or status of the mobile computing device 102 and/or computing device sub-systems. A hardware counter may include a special-purpose register of the processors/cores that is configured to store a count value or state of hardware-related activities or events occurring in the mobile computing device 102.

The behavior observer module 202 may also monitor the activities of the mobile computing device 102 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor the activities of the mobile computing device 102 by monitoring transmissions or communications of the mobile computing device 102, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may also monitor the activities of the mobile computing device 102 by monitoring the usage of, and updates/changes to, compass information, computing device settings, battery life, gyroscope information, pressure sensors, magnet sensors, screen activity, etc. The behavior observer module 202 may monitor notifications communicated to and from a software application (AppNotifications), application updates, etc. The behavior observer module 202 may monitor conditions or events pertaining to a first software application requesting the downloading and/or install of a second software application. The behavior observer module 202 may monitor conditions or events pertaining to user verification, such as the entry of a password, etc.

The behavior observer module 202 may also monitor the activities of the mobile computing device 102 by monitoring conditions or events at multiple levels of the mobile computing device 102, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile computing device 102 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device 102. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the mobile computing device 102 is in a holster may be relevant to recognizing suspicious behaviors, for example, because activities and functions related to active usage by a user (e.g., taking photographs or videos, sending messages, conducting a voice call, recording sounds, etc.) occurring while the mobile computing device 102 is holstered could be signs of nefarious processes executing on the device (e.g., to track or spy on the user).

Other examples of sensor level observations related to usage or external environments may include, detecting NFC signaling, collecting information from a credit card scanner, barcode scanner, or mobile tag reader, detecting the presence of a Universal Serial Bus (USB) power charging source, detecting that a keyboard or auxiliary device has been coupled to the mobile computing device 102, detecting that the mobile computing device 102 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device 102 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device 102, etc.

To reduce the number of factors monitored to a manageable level, in an aspect, the behavior observer module 202 may be configured to perform coarse observations by monitoring/observing an initial set of behaviors or factors that are a small subset of all factors that could contribute to the computing device's vulnerability or degradation. In an aspect, the behavior observer module 202 may receive the initial set of behaviors and/or factors from a server and/or a component in a cloud service or network. In an aspect, the initial set of behaviors/factors may be specified in machine learning classifier models. In an aspect, the machine learning classifier models may be models of critical behavior.

The behavior observer module 202 may communicate (e.g., via a memory write operation, function call, etc.) the collected behavior information to the behavior extractor module 204. The behavior extractor module 204 may be configured to receive or retrieve the collected behavior information, and use this information to generate one or more behavior vectors. Each behavior vector may succinctly describe the behavior of the device, software application, or process in a value or vector data-structure.

The vector data-structure may include series of numbers, each of which signifies a feature or a behavior of the mobile device, such as whether a camera of the mobile device is in use (e.g., as zero or one), how much network traffic has been transmitted from or generated by the mobile device (e.g., 20 KB/sec, etc.), how many internet messages have been communicated (e.g., number of SMS messages, etc.), and/or any other behavior information collected by the behavior observer module 202. As another example, the vector data-structure may include series of numbers that represent whether the picked the mobile device up from a table, whether the user has opened/launched an email application, a mobile payment application, or mobile game application, whether the user has handed the device off to another user, whether the user is an adult or child, whether user is actively engaged with the device (e.g., playing a game, etc.), etc.

In an aspect, the behavior extractor module 204 may be configured to generate the behavior vectors so that they function as an identifier that enables the mobile device system (e.g., the behavior analyzer module 206) to quickly recognize, identify, or analyze a behavior of the device. In an aspect, the behavior extractor module 204 may be configured to generate behavior vectors of size "n," each of which maps the behavior of a process or software application into an n-dimensional space. In an aspect, the behavior extractor module 204 may be configured to generate the behavior vectors to include information that may be input to a feature/decision node in the machine learning classifier to generate an answer to a query regarding a monitored activity or to determine whether a behavior is a critical activity that requires close monitoring.

In an aspect, the behavior extractor module 204 may be configured to generate the behavior vectors to include execution information. The execution information may be included in the behavior vector as part of a behavior (e.g., camera used 5 times in 3 second by a background process, camera used 3 times in 3 second by a foreground process, etc.) or as part of an independent feature. In an aspect, the execution state information may be included in the behavior vector as a shadow feature value sub-vector or data structure. In an aspect, the behavior vector may store the shadow feature value sub-vector/data structure in association with the features, activities, tasks for which the execution state is relevant.

The behavior extractor module 204 may communicate (e.g., via a memory write operation, function call, etc.) the generated behavior vectors to the behavior analyzer module 206. The behavior analyzer module 206 may be configured to apply the behavior vectors to classifier modules to determine whether a device behavior is a non-benign behavior that is contributing to (or is likely to contribute to) the device's degradation over time and/or which may otherwise cause problems on the device. The behavior analyzer module 206 may be configured to apply the behavior vectors to classifier modules to determine whether authentication is required, the number of authentication factors that are to be evaluated, the types of authentication factors that are to be evaluated, and the operations that are to be performed when evaluating the authentication factors. In addition, the behavior analyzer module 206 may be configured to apply the behavior vectors to classifier modules to determine the types of transactions that are underway, transaction type criticality values, user confidence values, software integrity confidence values, the historical behaviors of the software applications currently operating on the device, historical behavior values, vulnerability values, etc.

Each classifier model may be a behavior model that includes data and/or information structures (e.g., feature vectors, behavior vectors, component lists, etc.) that may be used by a computing device processor to evaluate a specific feature or aspect of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular activity is an ongoing critical activity and/or whether a particular computing device behavior is not benign. As an example, a device processor may be may be configured to receive a full classifier model from a network server, generate a lean classifier model in the mobile device based on the full classifier, and use the locally generated lean classifier model to classify a behavior of the device as vulnerable to attack or non-benign (e.g., malicious, performance degrading, etc.).

A locally generated lean classifier model is a lean classifier model that is generated in the computing device. That is, since mobile devices are highly configurable and complex systems, the features that are most important for determining whether a particular device behavior is non-benign (e.g., malicious or performance-degrading) may be different in each device. Further, a different combination of features may require monitoring and/or analysis in each device in order for that device to quickly and efficiently determine whether the computing device is vulnerable (and thus a higher level of user authentication is appropriate) or a particular behavior is non-benign. Yet, the precise combination of features that require monitoring and analysis, and the relative priority or importance of each feature or feature combination, can often only be determined using information obtained from the specific device in which the behavior is to be monitored or analyzed. For these and other reasons, various aspects may generate classifier models in the mobile device in which the models are used. These local classifier models allow the device processor to accurately identify the specific features that are most important in determining whether the computing device is vulnerable or a behavior on that specific device is non-benign (e.g., contributing to that device's degradation in performance). The local classifier models also allow the device processor to prioritize the features that are tested or evaluated in accordance with their relative importance to determining whether the computing device is vulnerable or classifying a behavior in that specific device.

A device-specific classifier model is a classifier model that includes a focused data model that includes/tests only computing device-specific features/entries that are determined to be most relevant to classifying an activity or behavior in a specific computing device. An application-specific classifier model is a classifier model that includes a focused data model that includes/tests only the features/entries that are most relevant for evaluating a particular software application. A user-specific classifier model may be a local classifier model that includes a focused data model that includes or prioritizes tests on the features/entries that are most relevant for identifying a user of the device, determining the persona of the user, determining whether a device behavior is consistent with the persona of an identified user, determining whether a device behavior is consistent with the ordinary usage of that device by one of its identified users, or for determining whether a user's activities are indicative of suspicious or non-benign behavior justifying a higher level of user authentication. By dynamically generating user-specific, device-specific, and/or application-specific classifier models locally in the mobile device, the various aspects allow the device processor to focus its monitoring and analysis operations on a small number of features that are most important for determining whether the operations of that specific mobile device and/or of a specific software application operating in that device are consistent with the personality, habits, or ordinary usage patterns of a known user of that specific device.

Any or all of the classifiers models discussed in this application may be, or may include, a model of critical behavior that identifies a critical behavior in association with a criticality level or a confidence, probability, priority, importance value that identifies the criticality of the behavior. Examples of critical behaviors include operations for processing near-field communication (NFC) payments, banking transactions, taking of pictures, recording of audio of video information, accessing a password or PIN, sending or receiving secured or encrypted emails, or any other activity or behavior that is monitored, analyzed, or classified as such by the modules 202-208.

In an aspect, the behavior analyzer module 206 may be configured to classify a behavior as "suspicious" when the results of its behavioral analysis operations do not provide sufficient information to classify a device behavior as either benign or non-benign. The behavior analyzer module 206 may be configured to notify the behavior observer module 202 in response to determining that a device behavior is suspicious. In response, the behavior observer module 202 may adjust the granularity of its observations (i.e., the level of detail at which computing device features are monitored) and/or change the factors or behaviors that are monitored based on information received from the behavior analyzer module 206 (e.g., results of the real-time analysis operations), generate or collect new or additional behavior information, and send the new/additional information to the behavior analyzer module 206 for further analysis/classification. Such feedback communications between the behavior observer module 202 and the behavior analyzer module 206 enable the mobile computing device 102 to recursively increase the granularity of the observations (i.e., make finer or more detailed observations) or change the features/behaviors that are observed until a collective behavior is classified as benign or non-benign, a source of a suspicious or performance-degrading behavior is identified, until a processing or battery consumption threshold is reached, or until the device processor determines that the source of the suspicious or performance-degrading device behavior cannot be identified from further changes, adjustments, or increases in observation granularity. Such feedback communication also enable the mobile computing device 102 to adjust or modify the behavior vectors and classifier models without consuming an excessive amount of the computing device's processing, memory, or energy resources.

In the various aspects, the mobile device 102 may be configured to work in conjunction with a network server to intelligently and efficiently identify the features, factors, and data points that are most relevant to determining whether the computing device is vulnerable or that an activity or behavior is non-benign. For example, the device processor may be configured to receive a full classifier model from the network server, and use the received full classifier model to generate lean classifier models (i.e., data/behavior models) that are specific for the users of the device and/or to the features and functionalities of the device or its software applications. The device processor may use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the classifier model cannot categorize, at which time a more robust (i.e., less lean) lean classifier model may be applied in an attempt to categorize the behavior. The application of ever more robust lean classifier models within the family of generated lean classifier models may be applied until a definitive classification of the behavior is achieved or the required level of user authentication or determined. In this manner, the device processor can strike a balance between efficiency and accuracy by limiting the use of the most complete, but resource-intensive lean classifier models to those situations where a robust classifier model is needed to definitively classify a behavior.

In various aspects, the device processor may be configured to generate lean classifier models by converting a finite state machine representation or expression included in a full classifier model into boosted decision stumps. The device processor may prune or cull the full set of boosted decision stumps based on application, device, or user-specific features to generate a lean classifier model that includes a subset of boosted decision stumps included in the full classifier model. The device processor may then use the lean classifier model to intelligently monitor, analyze and/or classify a device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions). Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the computing device).

Figure 3:
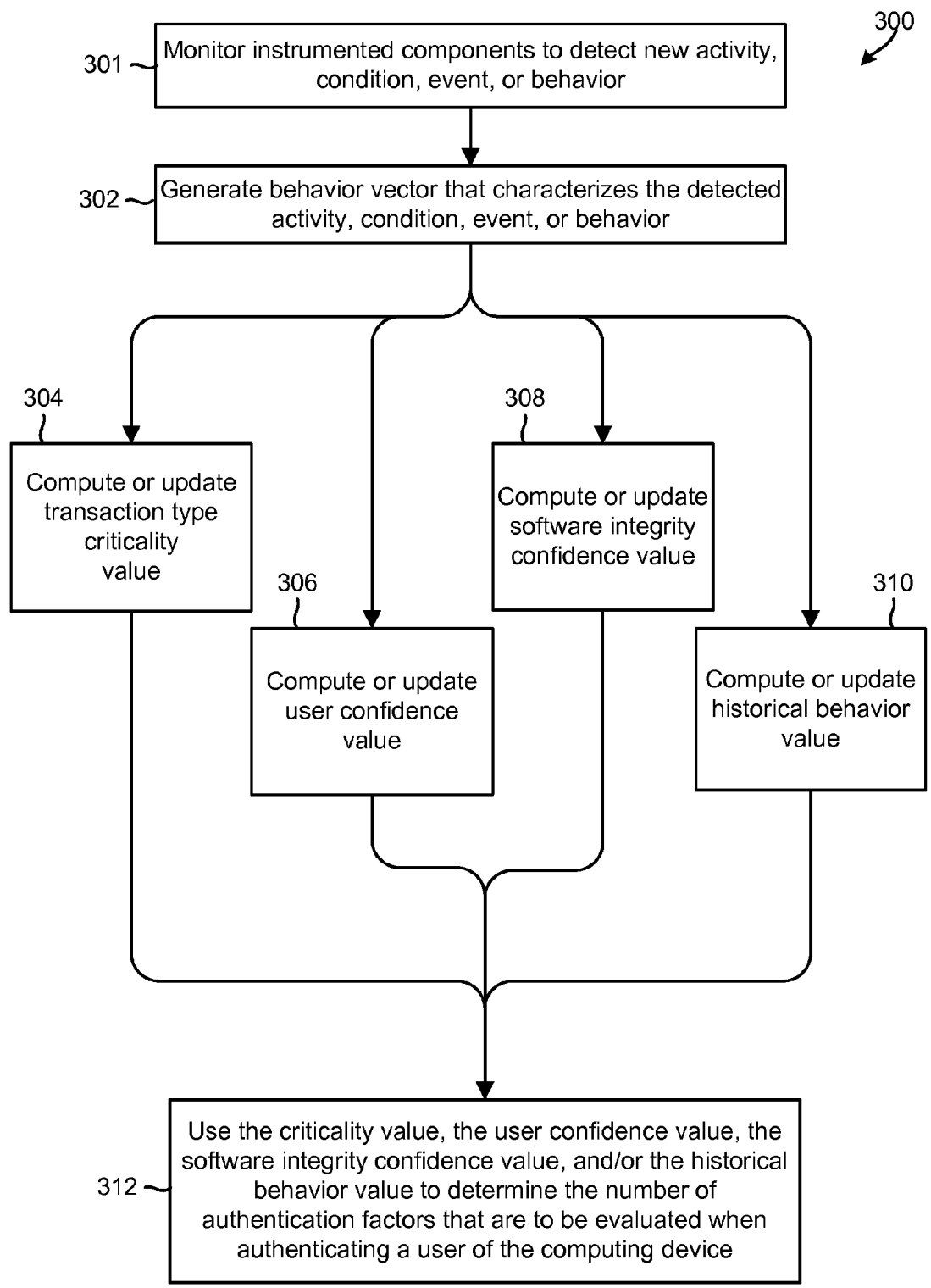
FIG. 3 is a process flow diagram illustrating a method of determining the number of authentication factors that are be evaluated when authenticating a user of the computing device in accordance with an aspect.

FIG. 3 illustrates a method 300 of intelligently determining the number of authentication factors that are to be evaluated when authenticating a user of a computing device in accordance with an aspect. Method 300 may be performed by a processing core or device processor of a mobile or resource constrained computing device. In block 301, the device processor may monitor instrumented components (e.g., APIs, registers, counters, etc.) at various levels of the computing device system to collect behavior information, and detect that a new activity, condition, event, or behavior is underway. In block 302, the device processor may generate a behavior vector that represents or characterizes the detected activity, condition, event, or behavior based on the collected behavior information.

In optional block 304, the device processor may compute a transaction type criticality value (or update a previously computed transaction type criticality value) based on the behavior vector. For example, the device processor may compare the behavior vector to a model of critical behavior to determine the criticality or importance of the behavior, and compute the transaction type criticality value based on the determined criticality or importance of the behavior. In an aspect, the device processor may set the transaction type criticality value to be equal to a value between zero and one, inclusive. For example, the device processor may set the value to "1.0" when the behavior is determined to be non-critical (e.g., the device has been moved), to "0.5" when the behavior is determined to be neutral, and to "0.1" when the behavior is determined to be highly critical (e.g., banking transaction using NFC payment).

In optional block 306, the device processor may compute a user confidence value (or update a previously computed user confidence value) based on the behavior vector. For example, the device processor may apply the generated behavior vectors to classifier models to determine whether the detected behavior is consistent with user's normal usage patterns, and use the results of applying the behavior vector to the model to compute the user confidence value. In an aspect, the device processor may set the user confidence value to be equal to a value between zero and one, inclusive, so as to indicate the degree in which the device's current usage pattern is consistent with normal usage patterns of the device by that user. For example, the device processor may set the value to "1.0" when the behavior is highly consistent with the normal usage patterns, to "0.5" when the behavior is neutral, and to "0.1" when the behavior is highly abnormal.

In optional block 308, the device processor may compute a software integrity confidence value (or update a previously computed software integrity confidence value) based on the behavior vector. The device processor may set the software integrity confidence value to be equal to a value between zero and one, inclusive, so as to indicate the degree of confidence that a software application associated with the behavior is benign. For example, the device processor may set the value to "1.0" if the behavior is classified as benign by the behavior analyzer module, to "0.8" if the behavior is determined to be mildly suspicious, to "0.2" if the behavior is determined to be highly suspicious, and to "0.0" if the behavior is determined to be non-benign.

In optional block 310, the device processor may compute a historical behavior value (or update a previously computed historical behavior value) based on the behavior vector and/or historical behavior information stored in memory. The historical behavior information may include information suitable for identifying a previously observed behavior of a related software application or process, the priority or relative importance of that behavior, whether the behavior was previously analyzed/classified as benign or non-benign, a classification confidence value for the previous classification of the behavior, a severity value identifying the degree of maliciousness or performance degradation (for behaviors classified as non-benign), timestamp values identifying when the behavior was last observed, analyzed or classified, and other similar information. In an aspect, the device processor may set the historical behavior value to be equal to a value between zero and one, inclusive, to indicate the degree in which the historical behavior information indicates that the detected activity, condition, event, or behavior is non-benign. For example, the device processor may set the value to "1.0" if the historical behavior information indicates that the behavior of a software application currently operating on the device was previously classified as benign, and to "0.8" if the behavior was determined to be suspicious last month, to "0.2" if the behavior was determined to be suspicious an hour ago and has a high priority or relative importance, and to "0.0" if the behavior was recently determined to be non-benign.

In block 312, the device processor may use any or all of the transaction type criticality value, user confidence value, software integrity confidence value, and historical behavior value to determine the number of authentication factors that are to be evaluated when authenticating a user of the computing device.

FIG. 4 illustrates an example sequence of events/behaviors that may be detected by the computing device, and example values that may be computed for the transaction type criticality value, user confidence value, software integrity confidence value, and historical behavior value based on each detected event/behavior. FIG. 4 also illustrates the level of security and the number of authentication factors may be determined dynamically based on the transaction type criticality value, user confidence value, software integrity confidence value, and historical behavior value.

In operation 452, the device processor detects (e.g., via information collected from an orientation sensor, etc.) that a user has picked up the computing device from a table or an equivalent height. As a result, the device processor sets the transaction type criticality value to "1.0," the user confidence value to "0.5" (since there is not yet enough info to identify the user), the software integrity confidence value to "1.0," and the historical behavior value to "0.7." Based on these values, the device processor sets the number of authentication factors appropriate for authenticating the user to three (3). In operation 453, the user logs into the device, and the device processor authenticates the user using three authentication factors (e.g., a password, finger print, security token, etc.).

In operation 454, the device processor detects that the user has opened/launch an email application. As a result, the device processor sets the transaction type criticality value to "0.4" (more critical), the user confidence value to "0.7" (having had a better opportunity to model the user with higher confidence), the software integrity confidence value to "1.0," and the historical behavior value to "0.7." Based on these values, the device processor increases the number of authentication factors appropriate for authenticating the user to four (4). In operation 455, the device processor authenticates the user using an additional authentication factor (e.g., activating a camera for facial recognition, etc.).

In operation 456, the device processor detects that the user has opened/launch a mobile payment application. As a result, the device processor sets the transaction type criticality value to "0.1" (highly critical), the user confidence value to "1.0" (very confident of user identity), the software integrity confidence value to "1.0," and the historical behavior value to "0.7." Based on these values, the device processor may increase the number of authentication factors appropriate for authenticating the user to five (5). In operation 457, the device processor authenticates the user using an additional authentication factor, such as by determining whether this specific sequence of operations is consistent the user's prior device usage patterns.

In operation 458, the device processor detects that the user has opened/launch a mobile game application. As a result, the device processor sets the transaction type criticality value to "0.9," the user confidence value to "1.0," the software integrity confidence value to "1.0," and the historical behavior value to "0.8." Based on these values, the device processor may decrease the number of authentication factors appropriate for authenticating the user to two (2).

In operation 460, the user hands the device to a child. The device processor detects that the user has handed the device to a second user, and that the second user is a child (e.g., based on the second user using two hands to interact with the device, by using facial recognition technologies, etc.) and sets the user confidence value to 0.5. As a result, the device processor sets the transaction type criticality value to "0.9," the user confidence value to "0.5," the software integrity confidence value to "1.0," and the historical behavior value to "0.8." Based on these values, the device processor may increase the number of authentication factors to three (3).

In operation 462, the device processor detects that the second user (child) has begun playing the game application. As a result, the device processor sets the transaction type criticality value to "0.9," the user confidence value to "1.0," the software integrity confidence value to "1.0," and the historical behavior value to "0.8." Based on these values, the device processor may decrease the number of authentication factors to two (2).

In operation 464, the device processor detects that the second user (child) has is attempting to download a suspicious or known malware application. As a result, the device processor sets the transaction type criticality value to "0.9," the user confidence value to "1.0," the software integrity confidence value to "0.0," and the historical behavior value to "0.1." Based on these values, the device processor may increase the number of authentication factors to six (6). In operation 465, the device processor authenticates the user using an additional authentication factors.

Figure 5:
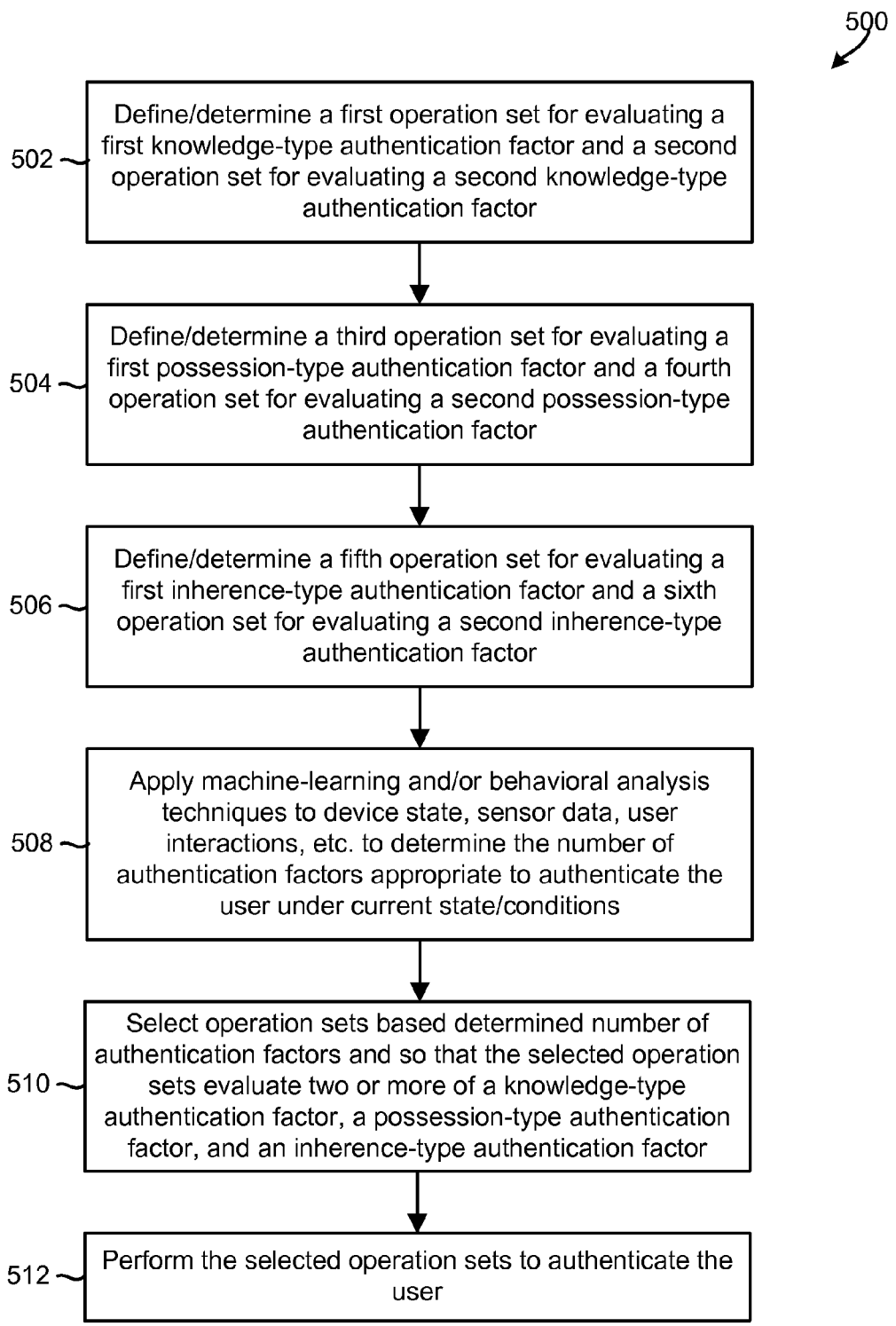
FIG. 5 is a process flow diagram illustrating a method of performing multi-factor authentication in accordance with an aspect.

FIG. 5 illustrates a method 500 of performing multifactor authentication in accordance with an aspect. The method 500 may be performed by a processing core or device processor of a mobile or resource constrained computing device. In block 502, the device processor may define a first operation set for evaluating a first knowledge-type authentication factor and a second operation set for evaluating a second knowledge-type authentication factor. The device processor may determine the first and second operation sets based on the operations of the behavior observer module 202 and/or the behavior analyzer module 206 discussed above with reference to FIG. 2.

In block 504, the device processor may define a third operation set for evaluating a first possession-type authentication factor and a fourth operation set for evaluating a second possession-type authentication factor, any or all of which may be determined based on the operations of the behavior observer and analyzer modules 202, 206. In block 506, the device processor may define a fifth operation set for evaluating a first inherence-type authentication factor and a sixth operation set for evaluating a second inherence-type authentication factor, which may also be determined based on the operations of the behavior observer and analyzer modules 202, 206.

In block 508, the device processor may apply machine-learning and/or behavioral analysis techniques to the collected behavior information, such as device state information, sensor data, user interaction information, etc., to determine the number of authentication factors appropriate to authenticate the user under the current state/conditions. In an aspect, this may be accomplished by performing the operations of method 300 discussed above with reference to FIG. 3. For example, in block 508, the device processor may use one or more of the criticality value, the user confidence value, the software integrity confidence value, and the historical behavior value to determine that three (3) of the six (6) authentication factors authentication factors should be evaluated when authenticating a user of the computing device.

In block 510, the device processor may determine which of the authentication factors should be evaluated and select operation sets based on the determined number of authentication factors and so that the selected operation sets evaluate two or more of a knowledge-type authentication factor, a possession-type authentication factor, and an inherence-type authentication factor. For example, in block 510, the processing core may use one or more of the criticality value, the user confidence value, the software integrity confidence value, and the historical behavior value to determine that the first and second knowledge-type authentication factors and the second inherence-type authentication factor should be evaluated when authenticating a user of the computing device, select the first and second operation sets for evaluating the first and second knowledge-type authentication factors, and select the fourth operation set for evaluating the second inherence-type authentication factor. In block 512, the device processor may perform the selected operation sets to authenticate the user.

Figure 6:
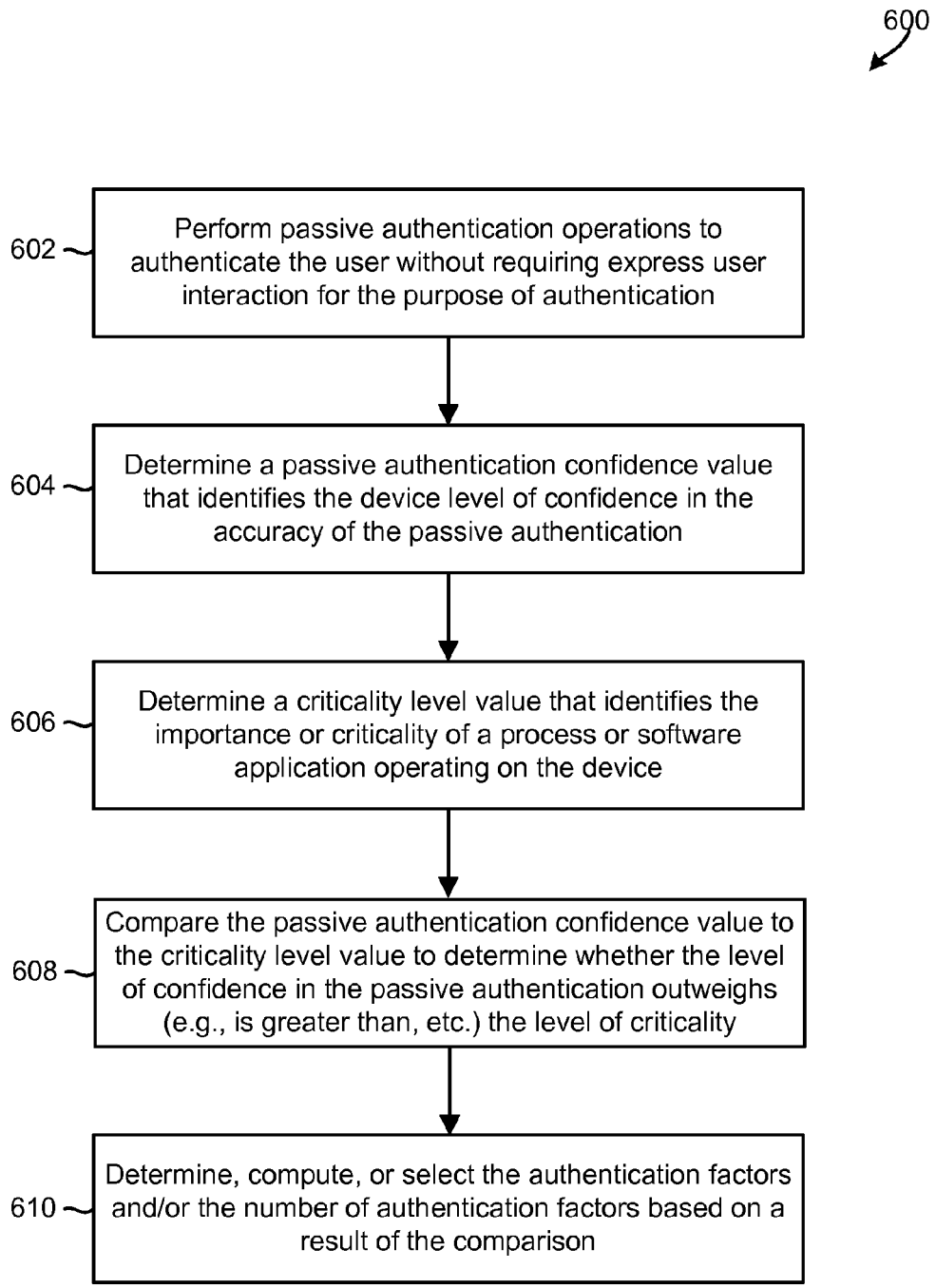
FIG. 6 is a process flow diagram illustrating a method of determining the number of authentication factors that are be evaluated when authenticating a user of the computing device in accordance with another aspect.

FIG. 6 illustrates a method 600 of determining authentication factors and/or the number of authentication factors in accordance with an aspect. Method 600 may be performed by a processing core or device processor of a mobile or resource constrained computing device. In block 602, the device processor may perform passive authentication operations to authenticate the user without requiring express user interaction for the purpose of authentication. In block 604, the device processor may determine a passive authentication confidence value that identifies the device level of confidence in the accuracy of the passive authentication. In block 606, the device processor may determine criticality level value that identifies the importance or criticality of a process or software application operating on the device. In block 608, the device processor may compare the passive authentication confidence value to the criticality level value to determine whether the level of confidence in the passive authentication outweighs (e.g., is greater than, etc.) the level of criticality. In block 610, the device processor may determine, compute, or select the authentication factors and/or the number of authentication factors based on a result of the comparison.

Figure 7:
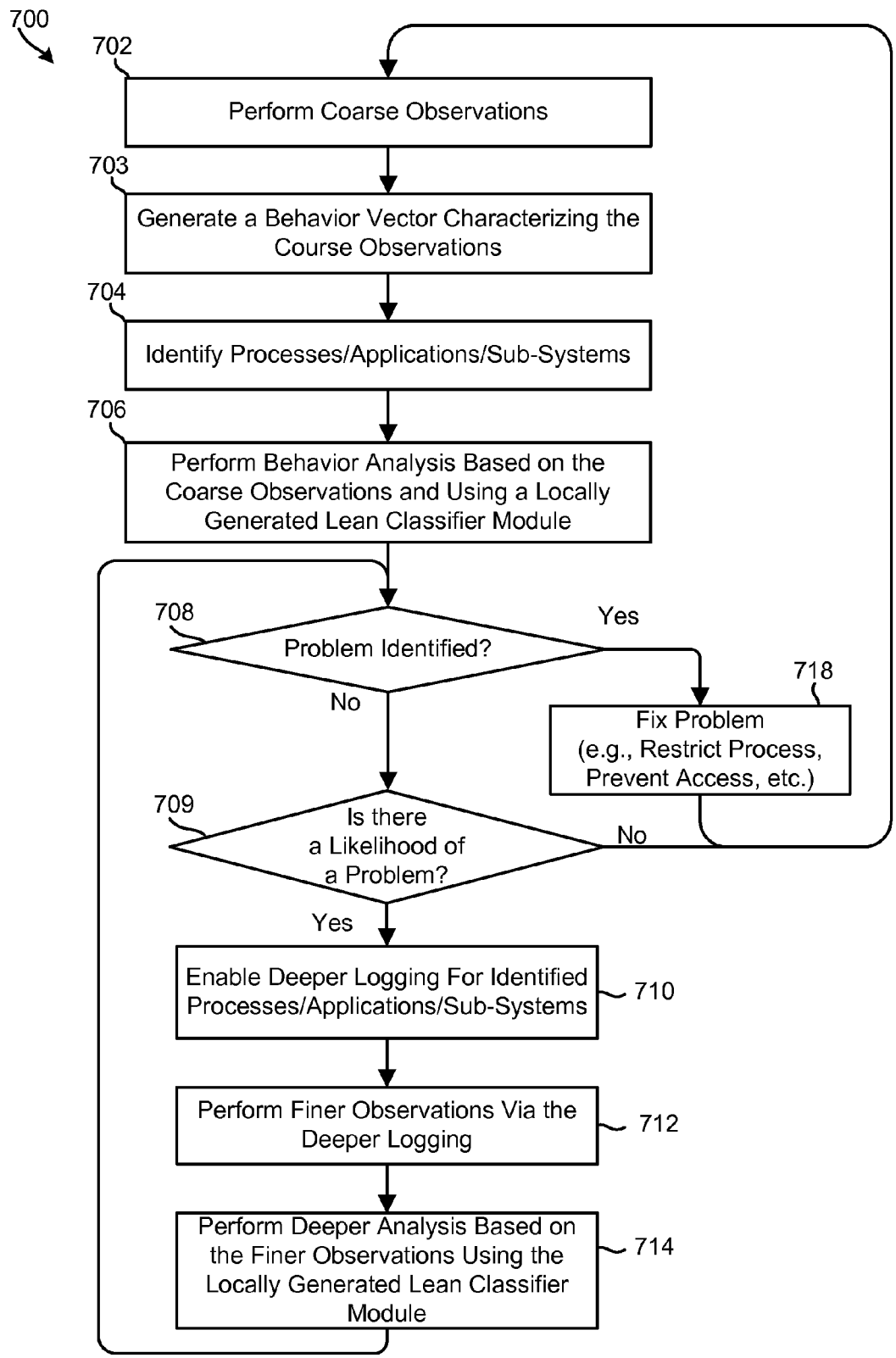
FIG. 7 is a process flow diagram illustrating an aspect method for performing adaptive observations on mobile devices.

FIG. 7 illustrates an example method 700 for performing dynamic and adaptive observations in accordance with an aspect. In block 702, the device processor may perform coarse observations by monitoring/observing a subset of a large number of factors/behaviors that could contribute to the mobile device's degradation. In block 703, the device processor may generate a behavior vector characterizing the coarse observations and/or the mobile device behavior based on the coarse observations. In block 704, the device processor may identify subsystems, processes, and/or applications associated with the coarse observations that may potentially contribute to the mobile device's degradation. This may be achieved, for example, by comparing information received from multiple sources with contextual information received from sensors of the mobile device. In block 706, the device processor may perform behavioral analysis operations based on the coarse observations.

In determination block 708, the device processor may determine whether suspicious behaviors or potential problems can be identified and corrected based on the results of the behavioral analysis. When the device processor determines that the suspicious behaviors or potential problems can be identified and corrected based on the results of the behavioral analysis (i.e., determination block 708="Yes"), in block 718, the processor may initiate a process to correct the behavior and return to block 702 to perform additional coarse observations.

When the device processor determines that the suspicious behaviors or potential problems cannot be identified and/or corrected based on the results of the behavioral analysis (i.e., determination block 708="No"), in determination block 709 the device processor may determine whether there is a likelihood of a problem. In an aspect, the device processor may determine that there is a likelihood of a problem by computing a probability of the mobile device encountering potential problems and/or engaging in suspicious behaviors, and determining whether the computed probability is greater than a predetermined threshold. When the device processor determines that the computed probability is not greater than the predetermined threshold and/or there is not a likelihood that suspicious behaviors or potential problems exist and/or are detectable (i.e., determination block 709="No"), the processor may return to block 702 to perform additional coarse observations.

When the device processor determines that there is a likelihood that suspicious behaviors or potential problems exist and/or are detectable (i.e., determination block 709="Yes"), in block 710, the device processor may perform deeper logging/observations or final logging on the identified subsystems, processes or applications. In block 712, the device processor may perform deeper and more detailed observations on the identified subsystems, processes or applications. In block 714, the device processor may perform further and/or deeper behavioral analysis based on the deeper and more detailed observations. In determination block 708, the device processor may again determine whether the suspicious behaviors or potential problems can be identified and corrected based on the results of the deeper behavioral analysis. When the device processor determines that the suspicious behaviors or potential problems cannot be identified and corrected based on the results of the deeper behavioral analysis (i.e., determination block 708="No"), the processor may repeat the operations in blocks 710-714 until the level of detail is fine enough to identify the problem or until it is determined that the problem cannot be identified with additional detail or that no problem exists.

When the device processor determines that the suspicious behaviors or potential problems can be identified and corrected based on the results of the deeper behavioral analysis (i.e., determination block 708="Yes"), in block 718, the device processor may perform operations to correct the problem/behavior, and the processor may return to block 702 to perform additional operations.

In an aspect, as part of blocks 702-718 of method 700, the device processor may perform real-time behavior analysis of the system's behaviors to identify suspicious behaviors from limited and coarse observations, to dynamically determine the behaviors to observe in greater detail, and to dynamically determine the precise level of detail required for the observations. This enables the device processor to efficiently identify and prevent problems from occurring, without requiring the use of a large amount of processor, memory, or battery resources on the device.

The various aspects improve upon existing solutions by using behavior analysis and/or machine learning techniques (as opposed to a permissions, policy, or rules-based approaches) to monitor and analyze the collective behavior of a select group of software applications. The use of behavior analysis or machine learning techniques is important because modern computing devices are highly configurable and complex systems, and the factors that are most important for determining whether software applications are colluding may be different in each device. Further, different combinations of device features/factors may require an analysis in each device in order for that device to determine whether software applications are colluding. Yet, the precise combination of features/factors that require monitoring and analysis often can only be determined using information obtained from the specific computing device in which the activity is performed and at the time the activity is underway. For these and other reasons, existing solutions are not adequate for monitoring, detecting, and characterizing the collective behavior of, or the relationships between, a plurality of software applications in the computing device, in real-time, while the behavior is underway, and without consuming a significant amount of the computing device's processing, memory, or power resources.

Figure 8:
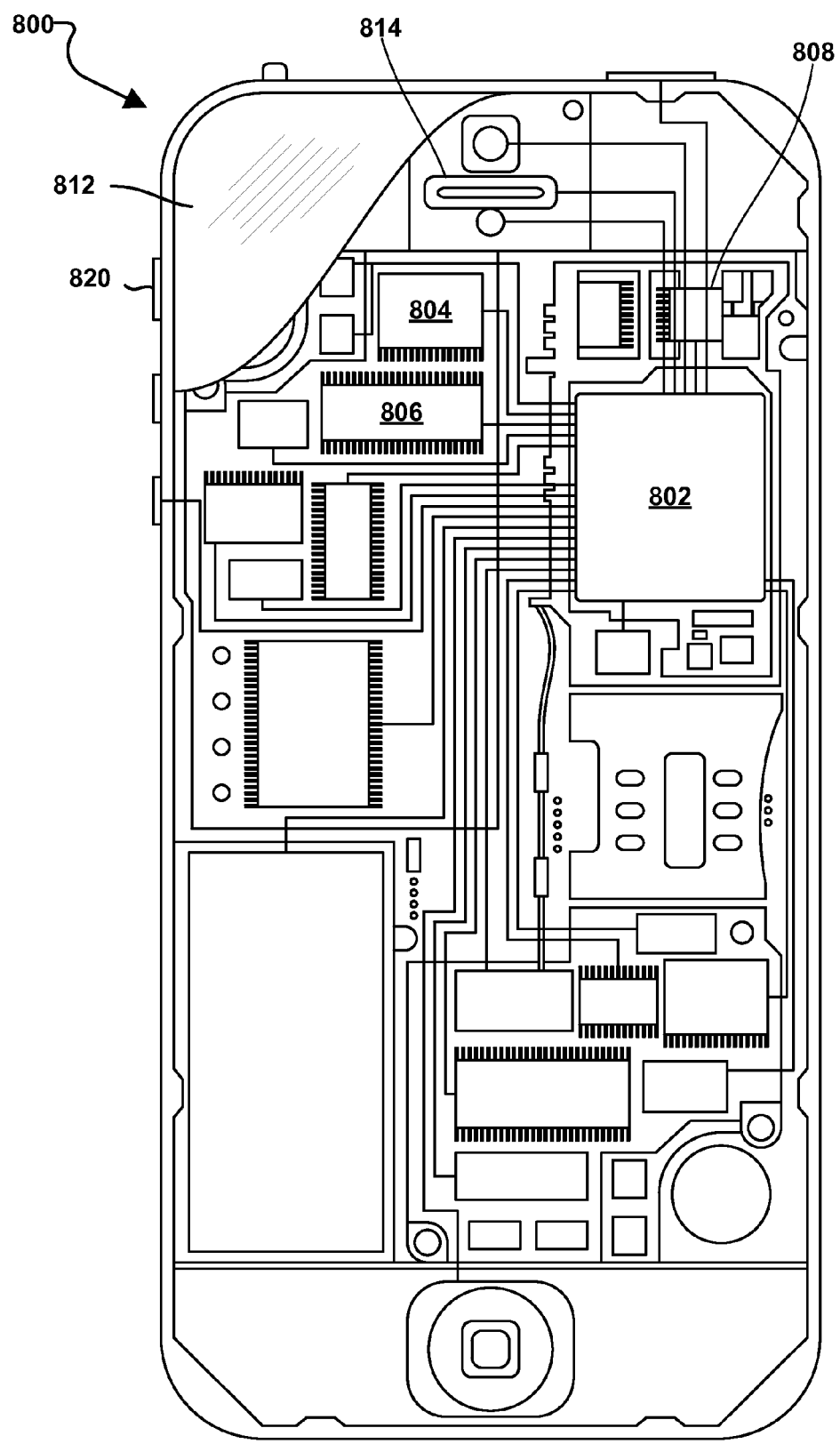
FIG. 8 is a component block diagram of a mobile device suitable for use in an aspect.

The various aspects, including the aspect discussed above with reference to FIGS. 2-7, may be implemented on a variety of computing devices, an example of which is illustrated in FIG. 8 in the form of a smartphone. A smartphone 800 may include a processor 802 coupled to internal memory 804, a display 812, and to a speaker 814. Additionally, the smartphone 800 may include an antenna for sending and receiving electromagnetic radiation that may be connected to a wireless data link and/or cellular telephone transceiver 808 coupled to the processor 802. Smartphones 800 typically also include menu selection buttons or rocker switches 820 for receiving user inputs.

A typical smartphone 800 also includes a sound encoding/decoding (CODEC) circuit 806, which digitizes sound received from a microphone into data packets suitable for wireless transmission and decodes received sound data packets to generate analog signals that are provided to the speaker to generate sound. Also, one or more of the processor 802, wireless transceiver 808 and CODEC 806 may include a digital signal processor (DSP) circuit (not shown separately).

The processor 802 may be any programmable microprocessor, microcomputer or multiple processor chip or chips that can be configured by software instructions (applications) to perform a variety of functions, including the functions of the various aspects described below. In some mobile devices, multiple processors 802 may be provided, such as one processor dedicated to wireless communication functions and one processor dedicated to running other applications. Typically, software applications may be stored in the internal memory 804 before they are accessed and loaded into the processor 802. The processor 802 may include internal memory sufficient to store the application software instructions. In various aspects, the processor 812 may be a device processor, processing core, or an SOC (such as the example SOC 100 illustrated in FIG. 1). In an aspect, the smartphone 800 may include an SOC, and the processor 802 may be one of the processors included in the SOC (such as one of the processors 101, 104, 106, 108, 110 illustrated in FIG. 1).

As used in this application, the term "performance degradation" refers to a wide variety of undesirable operations and characteristics of a computing device, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the mobile device or utilizing the phone for spying or botnet activities, etc. Also, behaviors, activities, and conditions that degrade performance for any of these reasons are referred to herein as "not benign" or "non-benign."

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of performing multifactor user authentication in a computing device, comprising:
    monitoring, via a processor of the computing device, an activity of a software application operating on the computing device to collect behavior information;
    using the collected behavior information to generate a behavior vector that characterizes the monitored activity of the software application;
    applying the generated behavior vector to a classifier model to generate an analysis result;
    using the generated analysis result to compute at least one value, the computed at least one value including one or more of a transaction type criticality value, a user confidence value, a software integrity confidence value, and a historical behavior value;
    using the computed at least one value to determine a number of authentication factors that are to be evaluated when authenticating a user of the computing device;
    using the computed at least one value to determine which authentication factor to use for each of the number of authentication factors that are to be evaluated when authenticating the user of the computing device; and
    authenticating the user by evaluating the determined number of the determined authentication factors.

2. The method of claim 1, further comprising:
    monitoring hardware and software systems of the computing device to determine the computing device's current vulnerability to unauthorized use.

3. The method of claim 1, wherein applying the behavior vector to the classifier model to generate the analysis result comprises applying the behavior vector to a model of critical activity to generate the analysis result.

4. The method of claim 3, wherein applying the behavior vector to the model of critical activity to generate the analysis result comprises:
    applying a multi-dimension vector data structure to the model of critical activity to generate the analysis result.

5. The method of claim 1, further comprising monitoring hardware and software systems of the computing device to learn over time a distinct way in which the user interacts with the computing device, wherein authenticating the user by evaluating the determined number of the determined authentication factors comprises determining whether a behavior of the software application is consistent with the distinct way in which the user interacts with the computing device.

6. The method of claim 1, wherein using the computed at least one value to determine the number of authentication factors that are to be evaluated when authenticating the user of the computing device further comprises:
    performing passive authentication operations to authenticate the user without requiring express user interaction;
    determining a passive authentication confidence value that identifies the computing device's level of confidence in an accuracy of the passive authentication operations;
    determining a criticality level value that identifies an importance or criticality of the software application operating on the computing device;
    comparing the passive authentication confidence value to the criticality level value to generate a comparison result that identifies whether a level of confidence in the passive authentication outweighs a level of criticality; and
    using the generated comparison result to determine the number of authentication factors that are be evaluated when authenticating the user of the computing device.

7. A computing device, comprising:
    a memory;
    a processor coupled to the memory, wherein the processor is configured with processor-executable instructions to perform operations comprising:
        monitoring an activity of a software application operating on the computing device to collect behavior information;
        using the collected behavior information to generate a behavior vector that characterizes the monitored activity of the software application;
        applying the generated behavior vector to a classifier model to generate an analysis result;
        using the generated analysis result to compute at least one value, the computed at least one value including one or more of a transaction type criticality value, a user confidence value, a software integrity confidence value, and a historical behavior value;
        using the computed at least one value to determine a number of authentication factors that are to be evaluated when authenticating a user of the computing device;
        using the computed at least one value to determine which authentication factor to use for each of the number of authentication factors that are to be evaluated when authenticating the user of the computing device; and authenticating the user by evaluating the determined number of the determined authentication factors.

8. The computing device of claim 7, wherein the processor is configured with processor-executable instructions to perform operations further comprising monitoring hardware and software systems to determine the computing device's current vulnerability to unauthorized use.

9. The computing device of claim 7, wherein the processor is configured with processor-executable instructions to perform operations such that applying the behavior vector to the classifier model to generate the analysis result comprises:
applying the behavior vector to a model of critical activity to generate the analysis result.

10. The computing device of claim 9, wherein the processor is configured with processor-executable instructions to perform operations such that applying the behavior vector to the model of critical activity to generate the analysis result comprises:
applying a multi-dimension vector data structure to the model of critical activity to generate the analysis result.

11. The computing device of claim 7, wherein:
the processor is configured with processor-executable instructions to perform operations further comprising monitoring hardware and software systems of the computing device to learn over time a distinct way in which the user interacts with the computing device; and
the processor is configured with processor-executable instructions to perform operations such that authenticating the user by evaluating the determined number of the determined authentication factors comprises determining whether a behavior of the software application is consistent with the distinct way in which the user interacts with the computing device.

12. The computing device of claim 7, wherein the processor is configured with processor-executable instructions to perform operations such that using the computed at least one value to determine the number of authentication factors that are to be evaluated when authenticating the user of the computing device further comprises:
performing passive authentication operations to authenticate the user without requiring express user interaction;
determining a passive authentication confidence value that identifies the computing device's level of confidence in an accuracy of the passive authentication operations;
determining a criticality level value that identifies an importance or criticality of the software application operating on the computing device;
comparing the passive authentication confidence value to the criticality level value to generate a comparison result that identifies whether a level of confidence in the passive authentication outweighs a level of criticality; and
using the generated comparison result to determine the number of authentication factors that are be evaluated when authenticating the user of the computing device.

13. A non-transitory computer readable storage medium having stored thereon processor-executable software instructions configured to cause a processor of a computing device to perform operations, comprising:
monitoring an activity of a software application operating on the computing device to collect behavior information;
using the collected behavior information to generate a behavior vector that characterizes the monitored activity of the software application;
applying the generated behavior vector to a classifier model to generate an analysis result;
using the generated analysis result to compute at least one value, the computed at least one value including one or more of a transaction type criticality value, a user confidence value, a software integrity confidence value, and a historical behavior value;
using the computed at least one value to determine a number of authentication factors that are to be evaluated when authenticating a user of the computing device;
using the computed at least one value to determine which authentication factor to use for each of the number of authentication factors that are to be evaluated when authenticating the user of the computing device; and
authenticating the user by evaluating the determined number of the determined authentication factors.

14. The non-transitory computer readable storage medium of claim 13, wherein the stored processor-executable software instructions are configured to cause a processor to perform operations further comprising:
monitoring hardware and software systems to determine the computing device's current vulnerability to unauthorized use.

15. The non-transitory computer readable storage medium of claim 13, wherein the stored processor-executable software instructions are configured to cause a processor to perform operations such that applying the behavior vector to the classifier model to generate the analysis result comprises applying the behavior vector to a model of critical activity to generate the analysis result.

16. The non-transitory computer readable storage medium of claim 15, wherein the stored processor-executable software instructions are configured to cause a processor to perform operations such that applying the behavior vector to the model of critical activity to generate the analysis result comprises applying a multi-dimension vector data structure to the model of critical activity to generate the analysis result.

17. The non-transitory computer readable storage medium of claim 13, wherein:
the stored processor-executable software instructions are configured to cause a processor to perform operations further comprising monitoring hardware and software systems of the computing device to learn over time a distinct way in which the user interacts with the computing device; and
the stored processor-executable software instructions are configured to cause a processor to perform operations such that authenticating the user by evaluating the determined number of the determined authentication factors comprises determining whether a behavior of the software application is consistent with the distinct way in which the user interacts with the computing device.

18. The non-transitory computer readable storage medium of claim 13, wherein the stored processor-executable software instructions are configured to cause a processor to perform operations such that using the computed at least one value to determine the number of authentication factors that are to be evaluated when authenticating the user of the computing device further comprises:
performing passive authentication operations to authenticate the user without requiring express user interaction;

determining a passive authentication confidence value that identifies the computing device's level of confidence in an accuracy of the passive authentication operations;

determining a criticality level value that identifies an importance or criticality of the software application operating on the computing device;

comparing the passive authentication confidence value to the criticality level value to generate a comparison result that identifies whether a level of confidence in the passive authentication outweighs a level of criticality; and using the generated comparison result to determine the number of authentication factors that are be evaluated when authenticating the user of the computing device.

19. A computing device, comprising:

means for monitoring an activity of a software application operating on the computing device to collect behavior information;

means for using the collected behavior information to generate a behavior vector that characterizes the monitored activity of the software application;

means for applying the generated behavior vector to a classifier model to generate an analysis result;

means for using the generated analysis result to compute at least one value, the computed at least one value including one or more of a transaction type criticality value, a user confidence value, a software integrity confidence value, and a historical behavior value;

means for using the computed at least one value to determine a number of authentication factors that are to be evaluated when authenticating a user of the computing device;

means for using the computed at least one value to determine which authentication factor to use for each of the number of authentication factors that are to be evaluated when authenticating the user of the computing device; and means for authenticating the user by evaluating the determined number of the determined authentication factors.

20. The computing device of claim 19, further comprising means for monitoring hardware and software systems to determine the computing device's current vulnerability to unauthorized use.

21. The computing device of claim 19, wherein means for applying the behavior vector to the classifier model to generate the analysis result comprises means for applying the behavior vector to a model of critical activity to generate the analysis result.

22. The computing device of claim 21, wherein means for applying the behavior vector to the model of critical activity to generate the analysis result comprises means for applying a multi-dimension vector data structure to the model of critical activity to generate the analysis result.

23. The computing device of claim 19, further comprising means for monitoring hardware and software systems of the computing device to learn over time a distinct way in which the user interacts with the computing device, wherein means for authenticating the user by evaluating the determined number of the determined authentication factors comprises means for determining whether a behavior of the software application is consistent with the distinct way in which the user interacts with the computing device.

24. The computing device of claim 19, wherein means for using the computed at least one value to determine the number of authentication factors that are to be evaluated when authenticating the user of the computing device further comprises:

means for performing passive authentication operations to authenticate the user without requiring express user interaction;

means for determining a passive authentication confidence value that identifies the computing device's level of confidence in an accuracy of the passive authentication operations;

means for determining a criticality level value that identifies an importance or criticality of the software application operating on the computing device;

means for comparing the passive authentication confidence value to the criticality level value to generate a comparison result that identifies whether a level of confidence in the passive authentication outweighs a level of criticality; and means for using the generated comparison result to determine the number of authentication factors that are be evaluated when authenticating the user of the computing device.

* * * * *